(12) United States Patent
Payne

(10) Patent No.: US 9,153,811 B2
(45) Date of Patent: Oct. 6, 2015

(54) METHOD FOR JOINING MULTIPLE PARALLEL TABS

(75) Inventor: Joshua W. Payne, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 557 days.

(21) Appl. No.: 13/231,103

(22) Filed: Sep. 13, 2011

(65) Prior Publication Data

US 2013/0065107 A1    Mar. 14, 2013

(51) Int. Cl.
*H01M 2/24* (2006.01)
*B23K 26/00* (2014.01)
*H01M 2/22* (2006.01)
*B23K 26/24* (2014.01)
*B23K 26/32* (2014.01)

(52) U.S. Cl.
CPC .............. *H01M 2/22* (2013.01); *B23K 26/246* (2013.01); *B23K 26/3213* (2013.01); *B23K 2201/38* (2013.01); *H01M 2220/20* (2013.01)

(58) Field of Classification Search
CPC ................................ H01M 2/22; B23K 26/246
USPC ........................................ 429/158; 219/121.64
See application file for complete search history.

(56) References Cited

U.S. PATENT DOCUMENTS

2011/0020690 A1 *   1/2011   Khakhalev et al. ........... 429/121

FOREIGN PATENT DOCUMENTS

CN         101388462 A  *  3/2009   .............. H01M 2/26

* cited by examiner

*Primary Examiner* — Karie O'Neill Apicella
(74) *Attorney, Agent, or Firm* — Fraser Clemens Martin & Miller LLC; James D. Miller

(57) ABSTRACT

Multiple cell tabs are effectively joined in a cost-effective and more consistent manner that can result in less mass and volume per interconnect. Cell tabs can be made of a material that is sufficiently thick enough to be able to carry several times the current of other tabs. The tabs are notched to engage an interconnecting member where the notching is performed in the same stage as making individual cell tab bends. Once the cell tabs are notched and bent, they are then positioned together such that the notched portions lie on the interconnecting member in a flat, side-by-side manner, all at the same height. The cell tabs are then held closely to the interconnect and laser-welded.

20 Claims, 3 Drawing Sheets

METHOD FOR JOINING MULTIPLE PARALLEL TABS

FIELD OF THE INVENTION

The present technology relates to joining multiple cell tabs in a more cost-effective and repeatable way, resulting in less mass and volume per interconnect.

BACKGROUND OF THE INVENTION

This section provides background information related to the present disclosure which is not necessarily prior art.

Multi-cell electrochemical devices, also referred to as battery cell stacks or multi-cell battery modules, can be used for a variety of applications, including powering various electronic devices, for vehicle propulsion, etc. While battery designs such as alkaline, voltaic pile, and lead-acid batteries are used in various household and industrial applications, evolving battery types such as nickel cadmium (NiCd), nickel-metal hydride (Ni-MH), lithium ion, and lithium ion polymer batteries display particular utility in emerging electric and hybrid gas/electric vehicle propulsion applications, due in part to increases in energy densities. Such batteries can be selectively rechargeable, for example, either as plug-in style batteries or onboard during a regenerative braking event, depending on the particular configuration of a vehicle.

In certain battery cells, electrode and separator sheets of adjacent cells can be laminated onto each other in order to provide a variety of cell stacking geometries and other cell configurations, whether aboard a vehicle or for other non-vehicular applications. For example, battery cells can be positioned adjacent one another, and their respective conductive terminals or cell tabs can be connected together in a particular manner suitable for completing the electrical circuit. In some cases, multiple tabs of the same or similar materials can be joined to another material, such as an interconnecting member, using ultrasonic welding methods. These methods, however, can result in variations in weld quality as portions of the ultrasonic tooling (e.g., horn and anvil) wear during use. Such wear also affects welding performance and presents an ongoing tooling expense. Moreover, the geometry and position of the interconnecting member relative to the cell tabs has to accommodate the ultrasonic welding apparatus, thereby limiting aspects of the multi-cell device design and configuration.

SUMMARY OF THE INVENTION

The present technology includes systems, methods, articles of manufacture, and compositions that relate to laser-welding of one or more cell tabs and interconnecting members in a multi-cell electrochemical device.

In some embodiments, a laser-welded interconnect comprises an interconnecting member and a plurality of electrochemical cells. The interconnecting member includes a substantially planar portion having first and second sides. The plurality of electrochemical cells extend in a substantially perpendicular direction away from the first side of the interconnecting member. Each electrochemical cell has a cell tab contacting the second side of the interconnecting member, where the contacting comprises a laser-weld.

In some embodiments, a method of joining electrochemical cells to an interconnecting member includes providing an interconnecting member and a plurality of electrochemical cells. The interconnecting member includes a substantially planar portion having first and second sides and the plurality of electrochemical cells extend in a substantially perpendicular direction away from the first side of the interconnecting member. Each electrochemical cell has a cell tab in proximity to the second side of the interconnecting member. The method includes laser-welding each cell tab to the second side of the interconnecting member.

In various embodiments, the present technology provides an electrochemical device comprising a laser-welded interconnect as disclosed herein. For example, the electrochemical device can be a battery, such as a lithium ion, lithium ion polymer, nickel metal hydride, or nickel cadmium battery. One or more batteries having the laser-welded interconnect can be used in a vehicle, including electric and hybrid gas/electric vehicle propulsion applications.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION OF THE INVENTION

The following description of technology is merely exemplary in nature of the subject matter, manufacture, and use of one or more inventions, and is not intended to limit the scope, application, or uses of any specific invention claimed in this application or in such other applications as may be filed claiming priority to this application, or patents issuing therefrom. In respect of the methods disclosed, the steps presented are exemplary in nature, and thus, the order of the steps is not necessary or critical.

The present technology relates to the joining of cell tabs of multiple parallel cells to an interconnecting member in a multi-cell electrochemical device via laser welding that can provide an alternative to ultrasonic welding methods. In particular, multiple parallel cell tabs are bent and notched in a fashion so that they can lie substantially in the same plane allowing multiple tabs to be laser-welded to an interconnecting member. In this manner, a lower pack volume and mass can be achieved for a battery cell, as well as high weld repeatability and reduced tool wear or tool damage incurred during manufacture.

Figure 1:
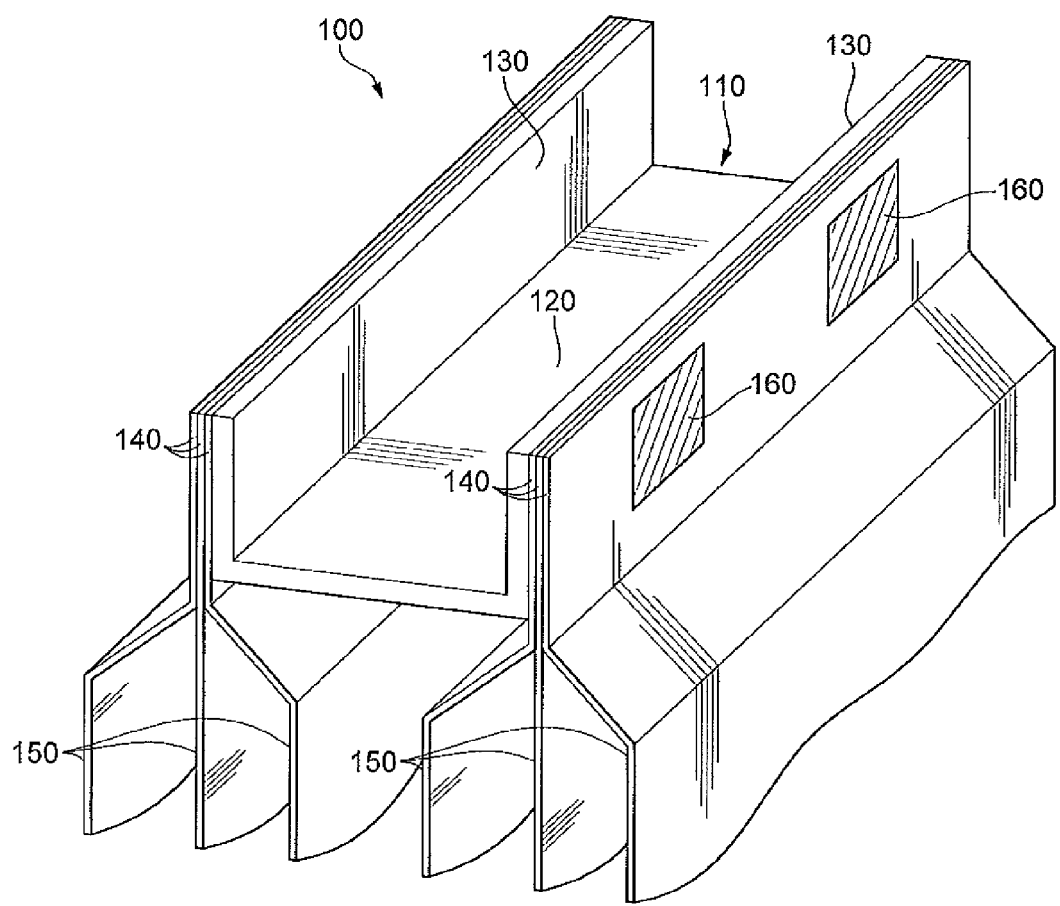
FIG. 1 illustrates a fragmentary perspective view of an embodiment of a conventional ultrasonically-welded interconnecting member and multiple cell tabs.

An embodiment of a conventional ultrasonically-welded interconnect 100 for a battery cell is shown in FIG. 1. An interconnecting member 110 includes a base 120 extending between a pair of lateral side walls 130 defining a generally U-shaped profile. Cell tabs 140 of two or more electrochemical cells 150 (three are shown on each side of the interconnecting member 110) are positioned adjacent each of the side walls 130 of the interconnecting member 110 and ultrasonically-welded to form one or more ultrasonic welds 160 (two are shown). The cells 150 can comprise generally parallel plates that extend beyond the portion shown, as indicated by the broken edge. The configuration of the side walls 130 and adjacent cell tabs 140 allows approach of the ultrasonic welding apparatus where they can be sandwiched between a fixed shaped nest (anvil) and a sonotrode (horn) during the welding operation (not shown). Known ultrasonic welding processes can result in variations in weld quality as the ultrasonic tools (e.g., anvil and horn) wear. This could result in inconsistency or variation in the ultrasonic welds 160. Moreover, the configuration of the side walls 130 and spacing of the base 120 of the interconnecting member 110 and cell tabs 140 needs to provide access for the ultrasonic welding apparatus in order to form the ultrasonic welds 160.

In comparison, the present technology eliminates weld variation due to wear, by eliminating the use of ultrasonic welding, and replacing it with a less variable process—laser welding. Manufacture and configuration of the cells can be changed so it is easier to maintain tool clearance compared to ultrasonic welding. The tabs of multiple cells can also be made of a material that is sufficiently thick enough to carry more electrical current than tabs used in ultrasonic welding methods. For example, an increase of three times the electrical current can be achieved where there are three cells in parallel. It is possible that two, four, or more cells can be in parallel. In the case of three parallel cells, the cell tabs can be three times thicker, where the cells can be notched so that each of the cell tabs individually contacts an interconnecting member without the need for sandwiching or stacking the tabs together in conjunction with the interconnecting member. As the cell tabs are notched and bent, for example, in a 1, 2, or 3 tab configuration, the cell tabs are then positioned together such that the notched portions all fit on the interconnecting member in a flat, side-by-side manner, where all can be at the same height. In this fashion, the cell tabs can be held closely to the interconnecting member and laser welded in a uniform manner. This can provide an improvement over thinner tabs used in a layered, multiple-cell case that may receive a varying intensity of welding energy resulting in weld variation, bad welds, no welds, or blowout, where one or more tabs are cut or vaporized, which may further vary throughout the layers of tabs in the stack.

Figure 2:
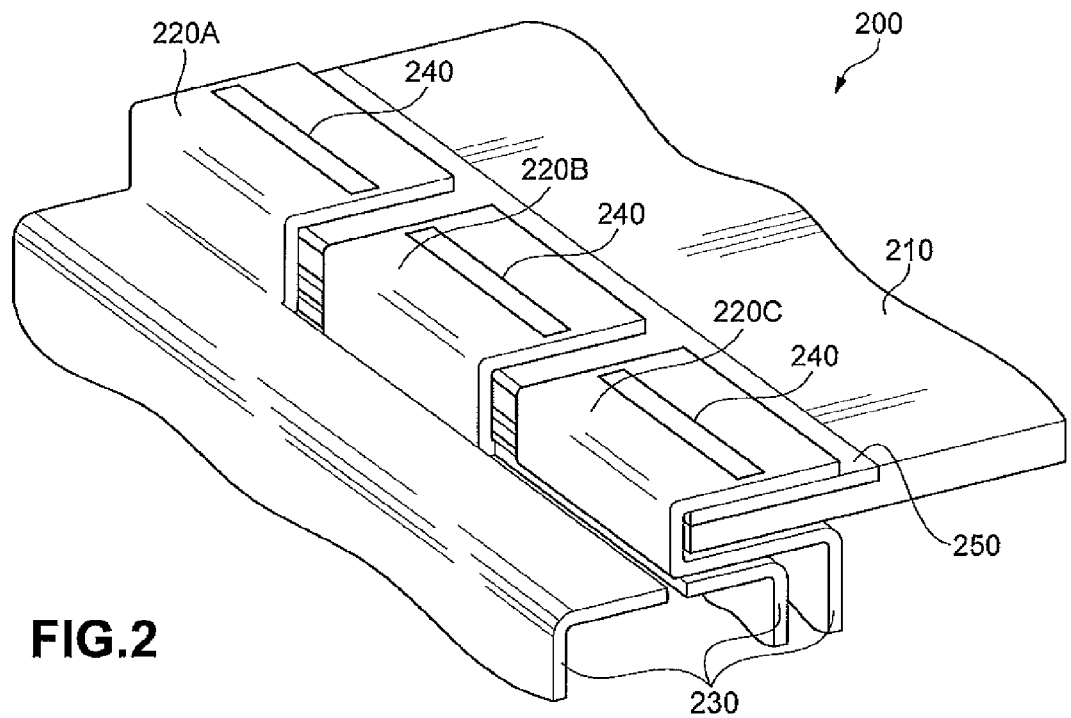
FIG. 2 illustrates a fragmentary perspective view of an embodiment of a laser-welded interconnecting member and multiple cell tabs.
Figure 3:
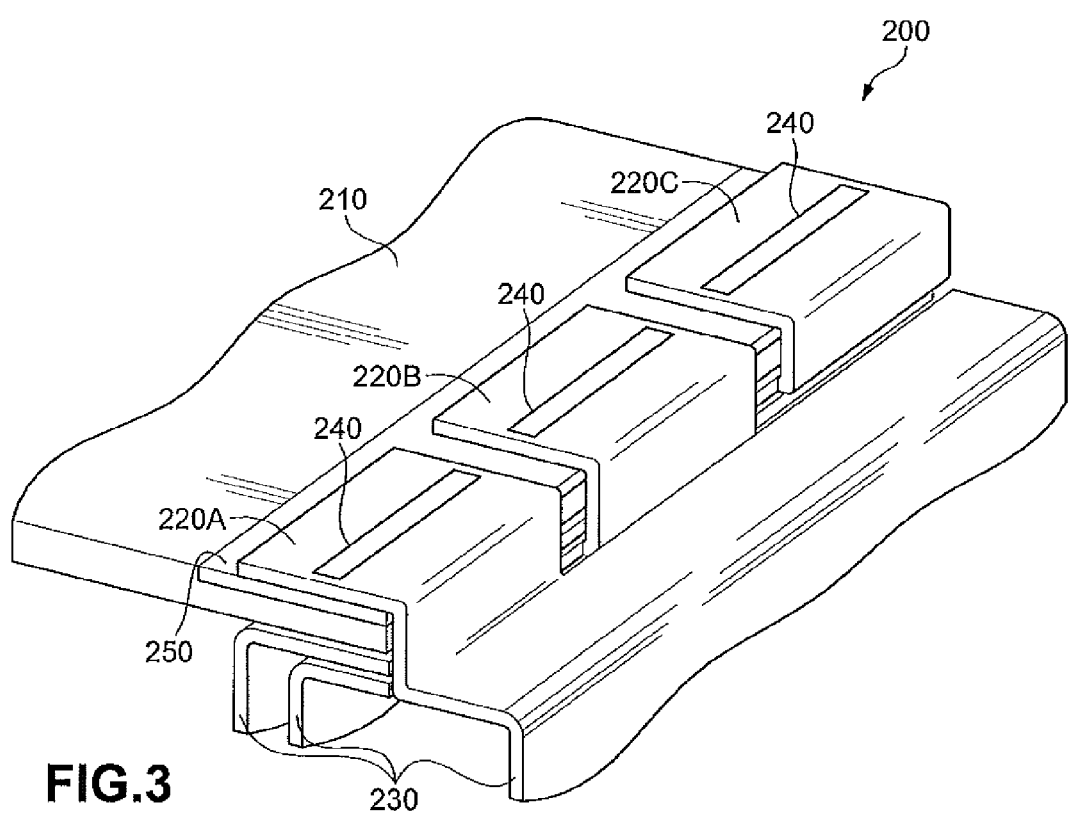
FIG. 3 illustrates a rotated fragmentary perspective view of the embodiment of a laser-welded interconnecting member and multiple cell tabs shown in FIG. 2.
Figure 4A:
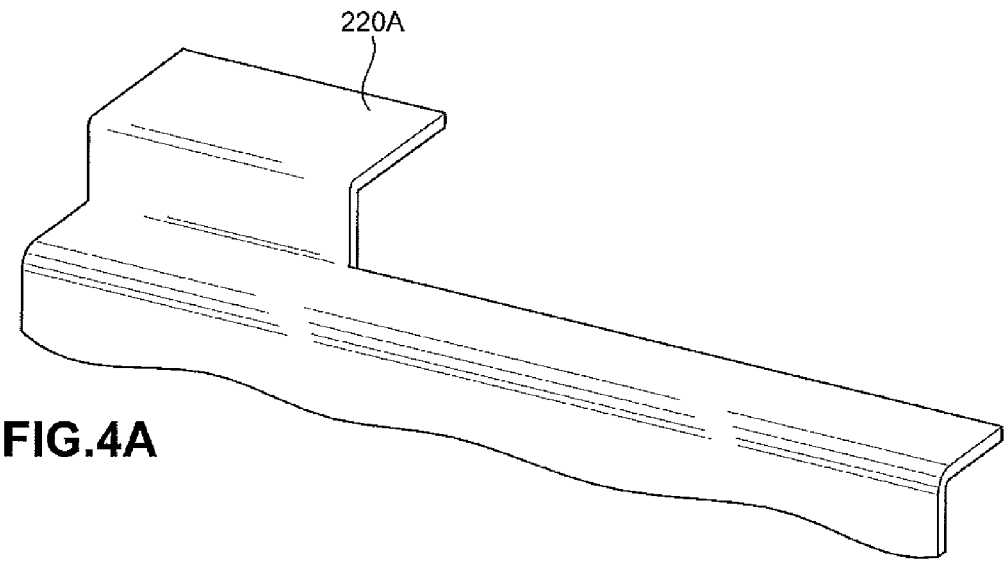
FIG. 4, panels A, B, and C illustrate a fragmentary perspective view of the individual cell tabs shown in FIGS. 2 and 3.
Figure 4B:
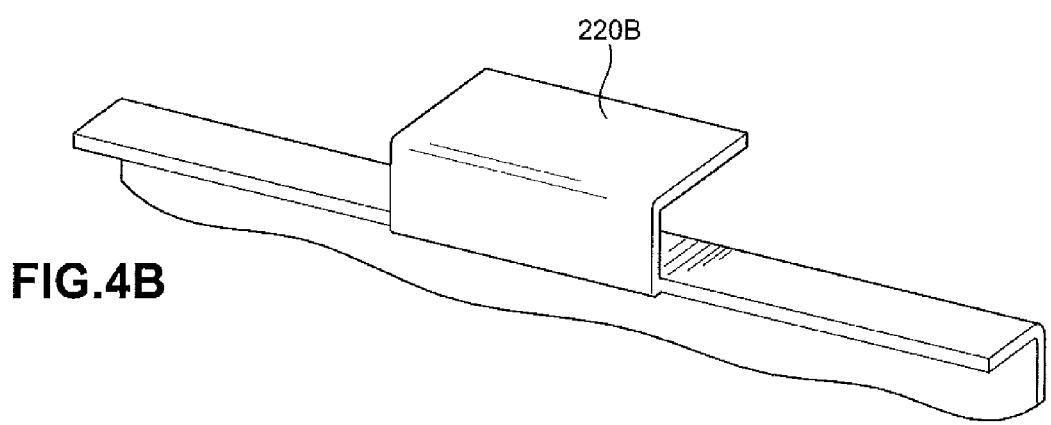
Figure 4C:
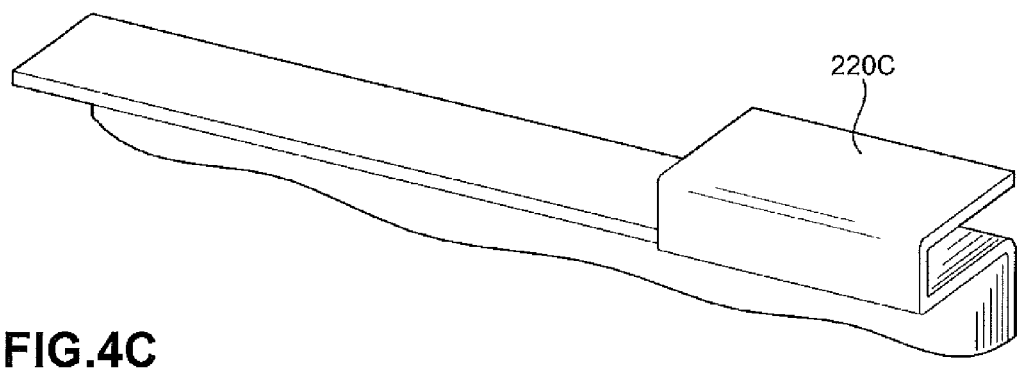

Referring now to FIGS. 2-4, an embodiment of a laser-welded interconnect 200 for a battery cell is shown. An interconnecting member 210 can have a substantially planar configuration where an edge thereof engages cell tabs 220A, 220B, 220C of multiple electrochemical cells 230 (three are shown engaging one edge of the interconnecting member 210). Another edge of the interconnecting member 210 (e.g., the opposite edge from that shown) can engage additional cell tabs of additional electrochemical cells in a similar fashion (not shown). For example, the interconnecting member 210 can extend beyond the portion shown, as indicated by the broken edge, and engage three cell tabs of three additional electrochemical cells.

The cell tabs 220A, 220B, 220C are notched and/or bent so that a portion of each tab lies adjacent to a surface of the interconnecting member 210 opposite the electrochemical cells 230. In this manner, a portion of each of the cell tabs 220A, 220B, 220C lies in substantially the same plane. The cell tabs 220A, 220B, 220C can therefore present substantially the same planar position with respect to the surface of the interconnecting member 210 opposite the electrochemical cells 230. The electrochemical cells 230 can be generally parallel to each other and can extend generally in a perpendicular direction away from the interconnecting member 210 beyond the portion shown, as indicated by the broken edge of the cells 230. The cell tabs 220A, 220B, 220C and electrochemical cells 230 can include one or more bends of various lengths to position the cell tabs 220A, 220B, 220C adjacent the interconnecting member 210 and spaced from the electrochemical cells 230.

The cell tabs 220A, 220B, 220C are laser-welded to the interconnecting member 210 to provide laser welds 240. The portion of the cell tabs 220A, 220B, 220C that lies in substantially the same plane adjacent the interconnecting member 210 allows approach and translation of a laser-welding apparatus across the various cell tabs 220A, 220B, 220C. This allows essentially the same laser-welding parameters to be applied to each of the cell tabs 220A, 220B, 220C due to the cell tabs 220A, 220B, 220C being side-by-side and presenting generally the same planar position. The laser-welded interconnect 200 consequently provides a lower profile than the ultrasonically-welded interconnect 100 due to the configuration of the cell tabs 220A, 220B, 220C and interconnecting member 210 versus the cell tabs 140 and U-shaped interconnecting member 110, respectively.

The interconnecting member 210 can further include a portion 250 adjacent the cell tabs 220A, 220B, 220C that comprises the same or a substantially similar material to the cell tabs 220A, 220B, 220C. The portion 250 can be a different material from a remainder of the interconnecting member 210. In this way, the laser-welding operation can form welds 240 between the same or similar material (e.g., where the portion 250 and cell tabs 220A, 220B, 220C comprise the same metal). Such welds 240 can be easier to form and can be more robust than welds formed between dissimilar materials. The interconnecting member 210 can have another portion that comprises the same or similar material to cell tabs positioned on another or opposite edge of the interconnecting member (not shown). In some embodiments, the interconnecting member 210 does not include the portion 250 so that the cell tabs 220A, 220B, 220C are welded directly to the interconnecting member 210 (not shown). In some embodiments, the interconnecting member 210 has one or more cell tabs welded to one or more portions 250 and one or more cell tabs welded directly to the interconnecting member 210 (not shown).

The laser-welded interconnect 200 can be configured for use in various battery designs, including lithium ion, lithium ion polymer, nickel metal hydride, nickel cadmium, etc. Components of the laser-welded interconnect 200 can comprise various materials. The interconnecting member 210 can comprise pure or elemental copper, copper alloy, nickel-plated copper, aluminum, aluminum alloy, or other conductive material. Where included, the one or more portions 250 of the interconnecting member 210 can comprise the same or a different material than the remainder of the interconnecting member 210. The portion(s) 250 can also comprise the same or similar material to the cell tabs 220A, 220B, 220C or a material that is compatible for laser-welding to the cell tabs 220A, 220B, 220C. The cell tabs 220A, 220B, 220C can comprise pure or elemental copper, copper alloy, nickel-plated copper, aluminum, aluminum alloy, or other conductive material. In some cases, the cell tabs 220A, 220B, 220C can comprise the same material as the electrochemical cells 230 and can be essentially extensions of the electrochemical cells 230. In other embodiments, the cell tabs 220A, 220B, 220C can comprise a different material than the electrochemical cells 230 where the cell tabs 220A, 220B, 220C are coupled to the electrochemical cells.

Laser welded battery cells according to the present technology allow tabs of multiple cells to be interconnected efficiently and consistently. The tabs can be notched to allow the tabs to lie flat on the same joining surface. Neighboring cells, in the same parallel set, can have sequentially notched tabs, so that they all lie next to each other in the same plane, once folded and presented to the laser welder. The ability to effect a flat, laser-weld joint allows for more favorable tool clearance to avoid tool touch-off arcing or shorting of neighboring cell tabs during the joining process. The use of notched cell tabs further allows for multiple parallel cell configurations (e.g., 2, 3, or more cells joined to one or more edges of the interconnecting member), all with the same common laser welding power settings. The battery cells produced according to the present technology can further utilize a common, clad, bimetal interconnect material to give the parallel interconnect a lower profile, which results in volume and height savings, and can provide an overall mass reduction in battery systems employing such battery cells. Depending on application-specific current demand needed, thicker tabs may also be employed to allow higher current carrying capacity. This is in contrast to ultrasonically welded battery cells, where multiple tab thicknesses and the interconnect member thickness need to relate to effective horn and anvil spacing and the ability to make an effective ultrasonic weld through the several layers. For example, when thicker tabs are used, the area for ultrasonic welding tool clearance decreases thereby increasing the chance for tool touch-off or shorting of the cell and resulting in damage.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A laser-welded interconnect comprising:
    a substantially planar interconnecting member having first and second sides and a first edge connecting the first side to the second side; and
    a plurality of electrochemical cells disposed adjacent the first side of the interconnecting member and extending in a substantially perpendicular direction away from the first side of the interconnecting member, each of the electrochemical cells having a cell tab extending therefrom adjacent the first edge of the interconnecting member and contacting the second side of the interconnecting member, wherein the contacting comprises a laser-weld.

2. The laser-welded interconnect of claim 1, wherein the electrochemical cells are substantially parallel.

3. The laser-welded interconnect of claim 1, wherein a portion of each cell contacting the second side of the interconnecting member lies in substantially the same plane.

4. The laser-welded interconnect of claim 3, wherein the portion of each cell tab contacting the second side of the interconnecting member is substantially co-planar with the second side of the interconnecting member.

5. The laser-welded interconnect of claim 1, wherein a portion of the second side of the interconnecting member further comprises a material that is different from a remainder of the interconnecting member, wherein the contacting comprises a laser-weld thereto.

6. The laser-welded interconnect of claim 5, wherein the material of the portion of the second side of the interconnecting member comprises the same material as the cell tabs.

7. The laser-welded interconnect of claim 1, wherein the interconnecting member comprises at least one of copper and a copper alloy.

8. The laser-welded interconnect of claim 1, wherein the cell tabs comprise at least one of copper, copper alloy, aluminum, and aluminum alloy.

9. The laser-welded interconnect of claim 1, wherein a portion of the interconnecting member contacts at least one cell tab of at least one additional electrochemical cell.

10. An electrochemical device comprising the laser-welded interconnect of claim 1.

11. The electrochemical device of claim 10, wherein the electrochemical device comprises at least one of a lithium ion, a lithium ion polymer, a nickel metal hydride, and a nickel cadmium battery.

12. A method of joining electrochemical cells to an interconnecting member comprising:
    providing a substantially planar interconnecting member having first and second sides and a first edge connecting the first side to the second side, and a plurality of electrochemical cells disposed adjacent the first side of the interconnecting member and extending in a substantially perpendicular direction away from the first side of the interconnecting member, each electrochemical cell having a cell tab extending therefrom adjacent the first edge of the interconnecting member and contacting the second side of the interconnecting member; and
    laser-welding each cell tab to the second side of the interconnecting member.

13. The method of claim 12, wherein the electrochemical cells are substantially parallel.

14. The method of claim 12, wherein a portion of each of the cell tabs contacting the second side of the interconnecting member lies in substantially the same plane.

15. The method of claim 14, wherein the portion of each cell tab contacting the second side of the interconnecting member is substantially co-planar with the second side of the interconnecting member.

16. The method of claim 15, wherein the laser-welding of each cell tab to the second side of the interconnecting member comprises substantially the same laser-welding parameters.

17. The method of claim 12, wherein a portion of the second side is formed from a first material and a remainder of the interconnecting member is formed from a second material different from the first material, and each cell tab is laser-welded to the portion of the second side formed from the first material.

18. The method of claim 17, wherein each of the cell tabs is formed from the first material.

19. The method of claim 12, wherein the first edge of the interconnecting member is substantially planar and a portion of each of the cell tabs extending adjacent the first edge of the interconnecting member extends in a direction parallel to the first edge of the interconnecting member.

20. The method of claim 19, wherein each of the portions of each of the cell tabs extending adjacent the first edge of the interconnecting member are aligned along a common plane.

* * * * *